I. M. RHOADES.
MUD AND SCALE COLLECTOR.
APPLICATION FILED SEPT. 24, 1915.

1,173,033.

Patented Feb. 22, 1916.
2 SHEETS—SHEET 1.

Witnesses
C. P. Rudolph
J. W. Garner

Inventor
Irvin M. Rhoades,
By Victor J. Evans
Attorney

UNITED STATES PATENT OFFICE.

IRVIN M. RHOADES, OF RACINE, OHIO.

MUD AND SCALE COLLECTOR.

1,173,033.

Specification of Letters Patent.

Patented Feb. 22, 1916.

Application filed September 24, 1915. Serial No. 52,523.

*To all whom it may concern:*

Be it known that I, IRVIN M. RHOADES, a citizen of the United States, residing at Racine, in the county of Meigs and State of Ohio, have invented new and useful Improvements in Mud and Scale Collectors to be Used in Any Type of Horizontal Steam-Boilers, of which the following is a specification.

This invention relates to improvements in mud and scale collectors, for use in steam boilers, to prevent the settling of mud and to also prevent the accumulation of scale in boilers and for discharging the mud and scale, by boiler pressure from time to time.

One object of my invention is to effect improvements in the construction of the collector whereby the same is provided with a cover which may be opened and used in connection with the collector for skimming the mud and the scale from the water in the boiler, and which may be closed over the collector to enable the mud and scale to be blown out of the collector and hence from the boiler by steam and water under boiler pressure.

Another object of the invention is to provide improved means for opening and closing the covering element of the collector.

With the above and other objects in view the invention consists in the construction, combination and arrangement of devices hereinafter described and claimed.

Figure 1:
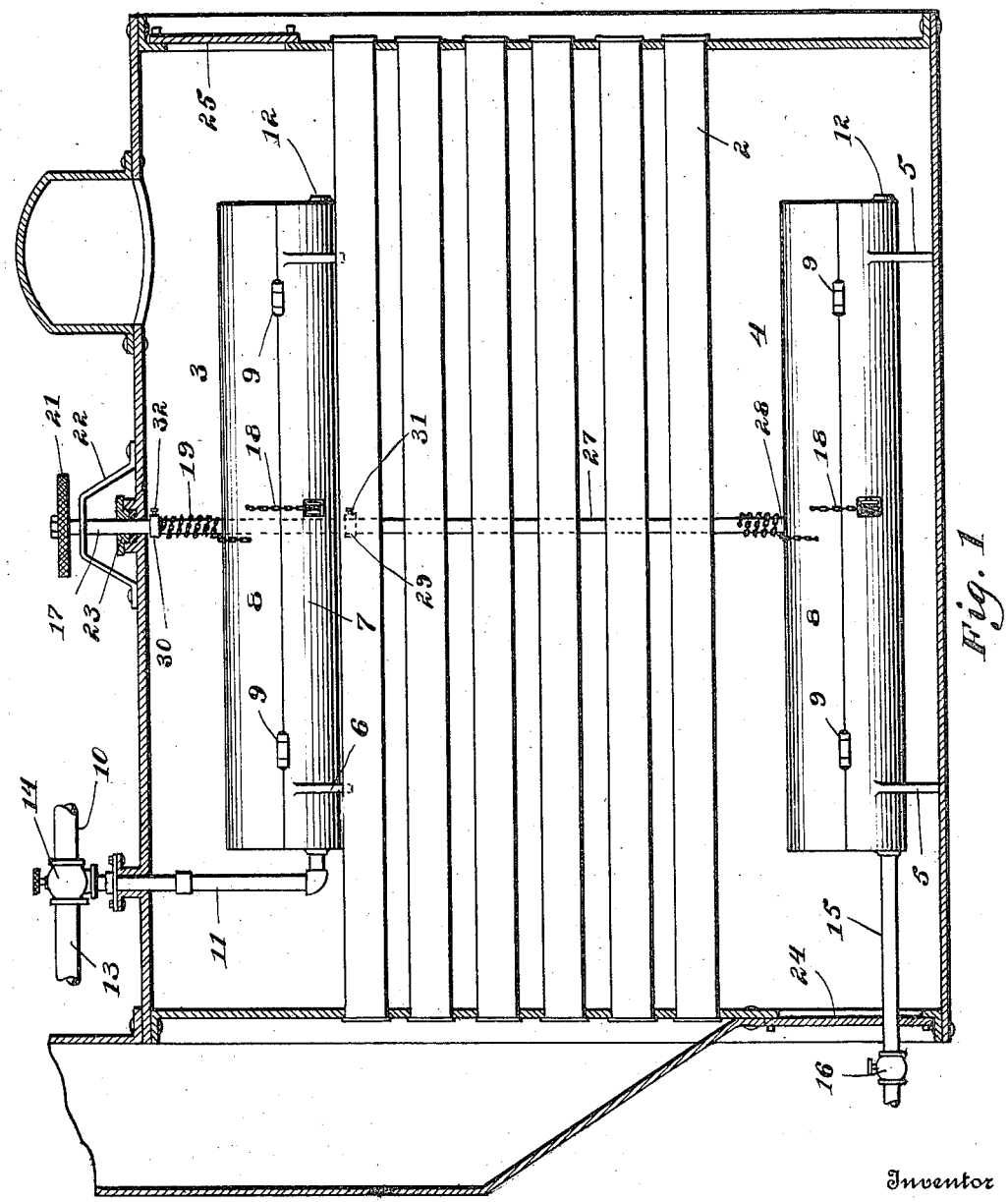
Figure 2:
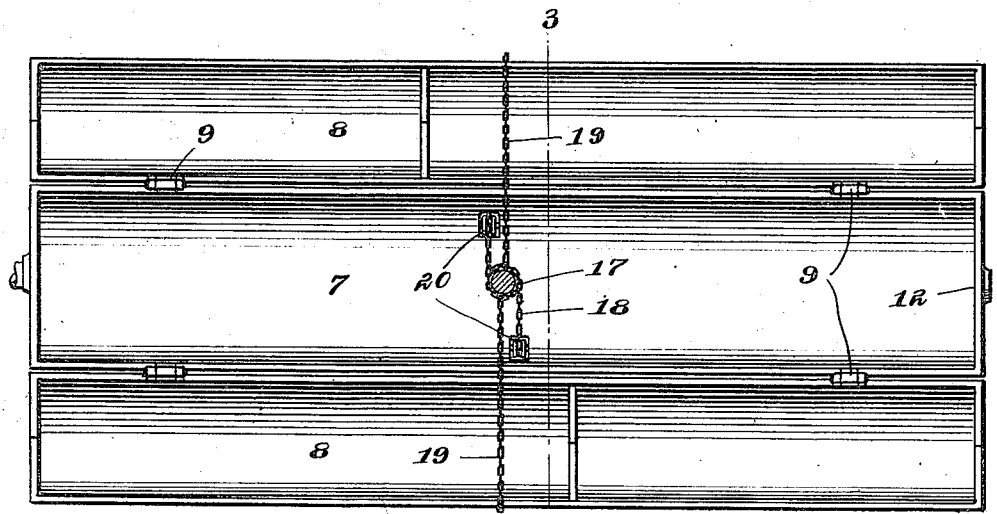
Figure 3:
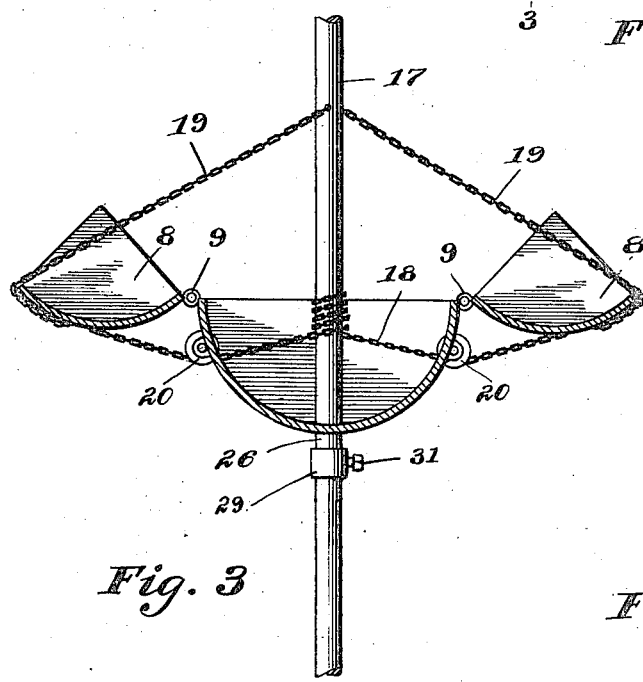
Figure 4:
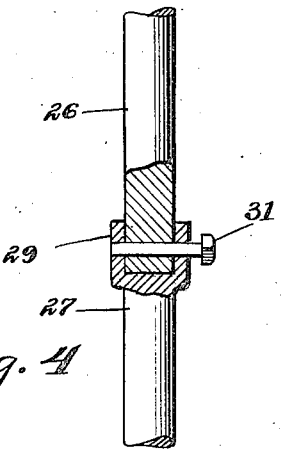

In the accompanying drawings:—Figure 1 is a vertical longitudinal sectional view of a steam boiler provided with mud and sediment collectors or skimmers constructed and arranged in accordance with my invention. Fig. 2 is a horizontal sectional view of the same, showing the mud collector or skimmer in plan and with its covering wings open and extended from opposite sides. Fig. 3 is a vertical transverse sectional view of the same. Fig. 4 is a detail sectional view on a larger scale.

The boiler 1 is here shown as a horizontal boiler, provided with flues 2. The mud collector or skimmer 3 is arranged above the flue and the sediment or scale collector 4 is arranged below the flue and is provided with supporting legs 5 which bear on the bottom of the boiler, the mud collector 3 being provided with flanges 6 which bear on the upper flues. Otherwise the collectors are identical in construction. Each collector comprises a body and a cover. The body 7 is here shown as semi-cylindrical in form and the cover is shown as comprising a pair of quarter or cylinder-segment members 8 which are connected to opposite sides of the body 7 by hinges 9 so that they can be closed over the body or opened and extended outwardly therefrom in opposite directions to form skimming wings which serve to skim the mud particles from the water in the upper portion of the boiler and to collect the sediment from the water in the lower portion of the boiler and hence prevent the accumulation of mud and the scale in the boiler, and also prevent bagging.

A feed water pipe 10 is connected to a pipe 11 which leads to one end of the body of the mud collector, the body of the mud collector being provided at the opposite end with an opening 12 the diameter of which is greater than that of the pipe 11. An exhaust pipe 13 may be put in communication with the pipe 11 by means of a three-way cock 14 which also enables the feed water pipe to be put in communication with the said pipe 11 and also enables the said pipe to be closed.

The operation of the mud collector is as follows:—When the covering and skimming wings 8 are open and extended and the boiler is in operation, the feed water pipe is connected to the pipe 11 by the three-way cock 14 and as the feed water passes into the boiler from the body and over the covering wings of the mud collector, the mud particles are skimmed and collected from the water and caused to settle in the body and in its covering and skimming wings. At suitable intervals of time the wings or covering elements 8 are closed over the body and the pipe 11 is disconnected from the feed water pipe and connected to the exhaust pipe 13 by the valve 14, thus causing water and steam from the boiler, at boiler pressure, to enter the collector through the opening 12 and to discharge and blow-off all the mud collected therein.

The scale collector 4 which otherwise operates in the same manner as the mud collector, is entirely disconnected from the feed water pipe 10 and is provided at the end opposite its opening 12 with a blow-off or discharge pipe 15 which is provided with a suitable valve 16.

I will now describe my improved means for operating the covers of the collectors and opening and closing them. A vertical shaft 17 which is common to both the collectors passes through an opening in the center of the bottom of the mud collector and has its lower end mounted in a bearing in the center of the bottom of the sediment or scale collector as shown. Chains 18 are attached to the said shaft and to the outer side of the collector wings or covering elements, to be wound on said shaft and close said wing or covering element over the bodies of the collectors when the shaft is turned in one direction, and chains 19 are attached to said covering or wing elements 8 and to the shaft and engage direction pulleys 20 mounted in openings in the sides of the bodies of the collectors, said chains 19 being wound on said shaft when the latter is turned in the reverse direction and caused to open said cover and skimming elements 8 as will be understood. Hence the shaft 17 is a common operating shaft for the covers for both of the collectors and serves to open or close the same simultaneously.

A hand wheel 21 is provided at the upper end of the shaft to enable the same to be turned. A bearing bracket 22 is provided on the boiler for the upper portion of the shaft and a packing box 23 is also provided therefor.

To enable the collectors to be removed from the boiler through the manholes 24—25, respectively, when desired, the shaft 17 is formed of an upper section 26, an intermediate section 27 and a lower section 28, detachably coupled together as at 29—30, and provided at the couplings with movable pins 31—32.

While I have herein shown and described a preferred form of my invention, I would have it understood that changes may be made in the form, proportion and construction of the several parts without departing from the spirit of the invention and within the scope of the appended claims.

Having thus described my invention, I claim:—

1. A collector of the class described for use in a boiler and comprising a body and a skimming element pivotally connected thereto at one side and adapted to be extended from the body or to be closed over the same and used as a cover therefor, and means to arrange said skimming element in open or closed position.

2. A collector of the class described, for use in a boiler, and comprising a body open at its upper side and a skimming element extending from one side of the body.

3. A collector of the class described for use in a boiler, and comprising a body and a skimming element pivotally connected thereto at one side and adapted to be extended from the body, or to be closed over the same and used as a cover therefor.

4. A boiler, a collector therein, a pipe leading to the collector, a feed water pipe, an exhaust pipe, both coupled to the first named pipe, and a valve to put the first named pipe in communication with either the feed water pipe or the exhaust pipe.

5. A boiler, a plurality of collectors therein and each comprising a body and covering means therefor adapted to be arranged in open or closed position, and common operating means for the covering means of the collector.

6. A collector of the class described for use in a boiler and comprising a body and skimming and covering means pivotally connected to opposite sides of the body, an operating shaft, flexible closing means connected to said wings and shaft for winding on the latter when the shaft is turned in one direction and flexible opening means connected to the wings and shaft for winding on the latter when the shaft is turned in the reverse direction.

In testimony whereof I affix my signature in presence of two witnesses.

IRVIN M. RHOADES.

Witnesses:
MARY C. SHANNON,
JOHN D. SHANNON.